Figure 1:
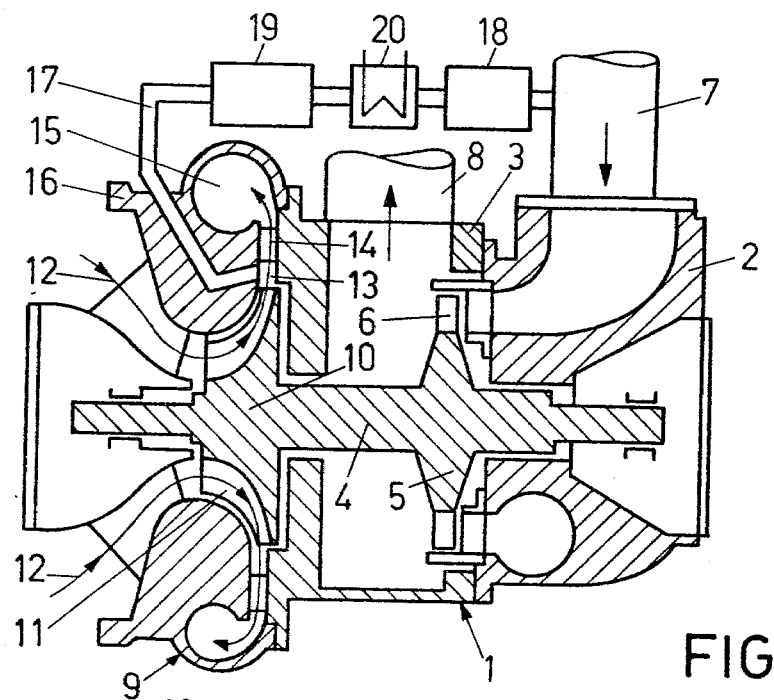

United States Patent [19]

Zehnder

[11] 4,250,711
[45] Feb. 17, 1981

[54] METHOD AND APPARATUS FOR SUPERCHARGING AN INTERNAL COMBUSTION ENGINE

[75] Inventor: Gottlieb Zehnder, Kirchdorf, Switzerland

[73] Assignee: BBC Brown, Boveri & Company, Limited, Baden, Switzerland

[21] Appl. No.: 715,677

[22] Filed: Aug. 19, 1976

[30] Foreign Application Priority Data

Aug. 29, 1975 [CH] Switzerland .................. 11225/75

[51] Int. Cl.³ ............................................. F02B 33/44
[52] U.S. Cl. ........................................ 60/605; 60/278
[58] Field of Search ............... 60/600, 602, 599, 605, 60/611, 613, 278, 279; 123/119 A

[56] References Cited
U.S. PATENT DOCUMENTS

| | | | |
|---|---|---|---|
| 2,659,194 | 11/1953 | Huber | 60/613 |
| 3,173,241 | 3/1965 | Birmann | 60/605 |
| 3,775,971 | 12/1973 | Gadefelt | 60/278 |
| 3,817,232 | 6/1974 | Nakajima et al. | 60/278 |
| 3,844,261 | 10/1974 | Garcea | 60/278 |
| 3,861,367 | 1/1975 | Kelmar | 60/278 |
| 3,914,944 | 10/1975 | Schmidt | 60/602 |
| 3,925,989 | 12/1975 | Pustelnik | 60/605 |

Primary Examiner—Robert E. Garrett
Attorney, Agent, or Firm—Burns, Doane, Swecker & Mathis

[57] ABSTRACT

An arrangement for supercharging an internal combustion engine such as a diesel engine wherein a turbocharger incorporating a turbine driven by the exhaust gases from the engine is coupled to and drives a compressor which provides charging air for the engine at the desired pressure. A portion of the exhaust gases is recirculated through the engine by introducing it into the charging air in a part of the compressor at a point following the rotor blading which is at a lower pressure than the exhaust gases thus avoiding any deleterious corrosion effect upon the blading. The amount of the exhaust gases being so recirculated is controlled either by an open or closed type of control circuit. The recirculated exhaust gases are conducted from either the inlet or outlet side of the turbine to the compressor through a feedback path which includes the open or closed loop control and which may also include a receiver for equalizing out any fluctuations in exhaust gas pressure, an auxiliary compressor, a cooler or a one-way valve.

7 Claims, 4 Drawing Figures

METHOD AND APPARATUS FOR SUPERCHARGING AN INTERNAL COMBUSTION ENGINE

The present invention concerns an improved method for super-charging an internal combustion engine, in particular a diesel engine, by means of at least one turbocharger incorporating an exhaust-gas turbine, a compressor, an intake duct conducting the exhaust gases to the exhaust-gas turbine and an outlet duct conducting the exhaust gases from the exhaust-gas turbine, exhaust gases being fed back to the compressor for the purpose of mixing them with the charging air. The invention also concerns apparatus for implementing the method.

Supercharging internal combustion engines, in particular diesel engines, by means of exhaust-gas turbocharges has been known for a long time. The air required for burning the fuel is compressed to a pressure higher than atmospheric in a compresser driven by an exhaust-gas turbine, and passed in the compressed state to the cylinders of the engine. In this manner a larger quantity of fuel, corresponding to the greater weight of air, is burned and hence a greater output is achieved than in the case of an engine without supercharging, which must itself draw in its combustion air from the surrounding atmosphere.

Another known method of supercharging an engine is to use "charging air" to which a limited quantity of exhaust gases has been added. In this way various advantageous effects can be achieved, such as a reduction of the ignition noise known as "diesel knock," a shorter ignition delay owing to an increase in combustion chamber temperature at small partial loads, and slower combustion as a result of the reduction in the oxygen content of the cylinder charge. Also, the emission of harmful substances can be reduced, particularly with the diesel engine working at part load, because recirculating exhaust gas lowers the oxygen content of the combustion air and hence the effective excess air of the unburned gases, the result of which is slower combustion, a lowering of the maximum combustion temperature and a slowing of the reaction rate at which nitrous oxide is formed. This is of major significance because the legally permitted values for pollutant emission have recently been substantially reduced. At small part loads relatively large amounts of exhaust gas can be recirculated without an air shortage occurring at once. At higher part loads, recirculating too great an amount of exhaust gas brings about a shortage of air, and hence a fall in output. The optimum quantity of recirculated exhaust gas is therefore generally not constant; rather it depends on the instantaneous engine output and varies in inverse proportion to the output.

In the case of engines operating without supercharging and those operating with supercharging by means of a pressure-wave machine, considerable advances have already been made as regards exhaust gas recirculation and hence reduction of pollutant emission, as is evident from German patent DT-PS 1 451 994 and Swiss patent CH-PS 552 135. However, exhaust gas recirculation for engines charged with turbochargers is only in the experimental stage and has not yet been applied in practice. In the tests hitherto, such as described for example in Motortechnische Zeitschrift, vol. b 33, no. 2, Feb. 1972, exhaust gas has been withdrawn from the gas stream after the turbocharger turbine and introduced again into the air stream of the compressor ahead of the compressor inlet. These tests have shown that when exposed to the exhaust gases, the compressor impellers, which are of lightweight metal, firstly become contaminated very quickly and secondly corrode very rapidly. However, lightweight metals, aluminum for example, are required as the material for the compressor impellers in order to keep centrifugal forces, and the stresses arising from these, within acceptable limits, and thus introducing the exhaust gases ahead of the compressor inlet does not present a practical solution to the problem.

The object of the invention is to avoid this disadvantage and to create a method as stated above whereby the exhaust gases are recirculated in such a way that the compressor blades are bypassed and become neither contaminated nor corroded.

This object is achieved in that the recirculated exhaust gases are introduced under pressure in a part of the compressor which is also under pressure, at at least one location disposed after the rotor blading when viewed in the flow direction.

Apparatus for implementing the method comprises at least one return duct for recirculating the exhaust gases which terminates at a place in the compressor which is under pressure during operation and is disposed after the rotor blading when viewed in the flow direction.

Figure 2:
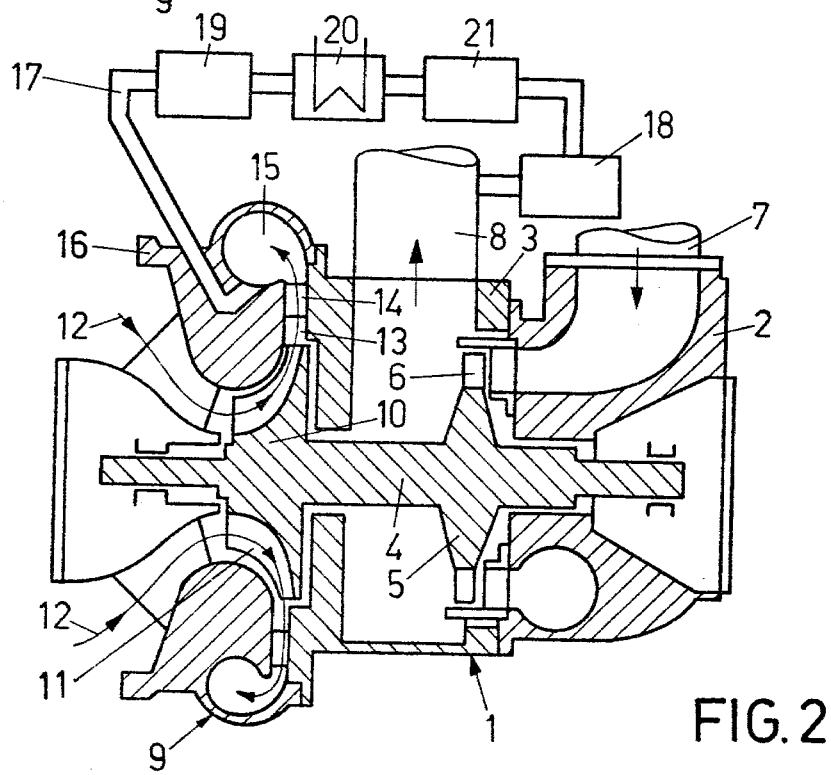
Figure 3:
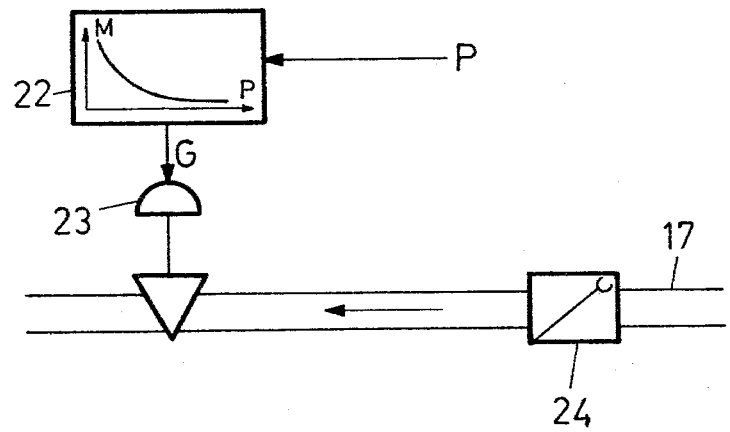
Figure 4:
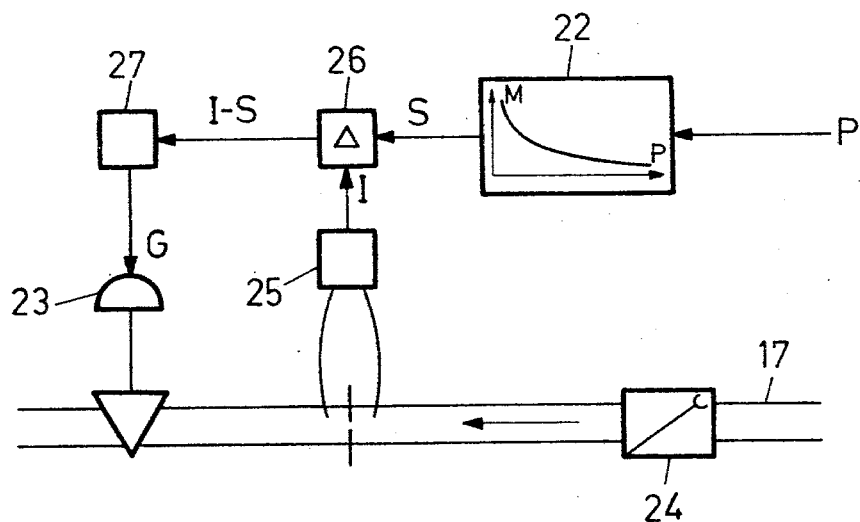

Examples of the invention are explained below with reference to the accompanying drawings, in which:

FIG. 1 shows a turbocharger in which the exhaust gases drawn from the inlet duct are introduced into the diffusor space of the compressor, FIG. 2 shows a turbocharger in which the exhaust gases drawn from the outlet duct are introduced into a volute-shaped space of the compressor, FIG. 3 shows a schematic representation of an open-loop control system serving to control the quantity of recirculated exhaust gases, and FIG. 4 shows a schematic representation of a closed-loop control system for regulating the quantity of recirculated exhaust gases.

In the various figures of the drawings identical parts are identified by the same reference symbols.

The turbocharger shown in FIG. 1 consists of the exhaust-gas turbine 1 and the compressor 9 driven by the latter. The exhaust gases originating from the cylinders of the engine (not shown) flow via the inlet duct 7 into the gas inlet housing 2, from this via the turbine blades 6 of the turbine rotor 5, through which the flow is axial, into the gas outlet housing 3 and out via the outlet duct 8. Mounted on the turbine shaft 4 is the compressor impeller 10 with radially extending impeller blades 11. Ambient air flowing in the direction of arrows 12 is drawn in, compressed to the required pressure and fed as charging air to the cylinders of the engine. The air flows through the compressor blades 11 into the diffusor space which comprises an annular, unbladed diffusor portion 13 followed by a diffusor portion 14 which is also annular, but bladed. From here the air flows into the volute 15 and via an outlet port (not shown) in the compressor housing 16 to the cylinders of the engine.

A feedback path in the form of a duct 17 for the exhaust gases to be added to the charging air branches from the inlet duct 7 and terminates in the unbladed portion 13 of the diffusor. Here the angle which the end portion of the feedback duct 17 makes with the direction of the main flow is such that the exhaust gases flow into the compressor 9 with a velocity component directed in the direction of the main flow.

Provided in the feedback duct is a receiver 18 of large volume which serves as a mixing device to equalise fluctuations in the exhaust-gas pressure. The exhaust gases leave the receiver 18 at a constant pressure, thus providing a relatively easy way of controlling the quantity of exhaust gas to be introduced into the compressor by means of open-loop or closed-loop control, the control process taking place in the device 19. Situated between the receiver 18 and device 19 is a cooling device 20 which serves to cool the exhaust gases before they enter the compressor.

With the operation at constant pressure, or similar to constant-pressure operation, the receiver 18 is superfluous. Under certain circumstances the cooling device 20 can also be omitted, especially if the air/exhaust-gas mixture is cooled after leaving the compressor.

With the apparatus shown in FIG. 2, the exhaust gases are no longer drawn from the inlet duct 7, in which they are at a pressure of some 2–4 bar, but from the outlet duct 8, in which they are at a pressure which is only slightly higher than atmospheric pressure. For this purpose, the feedback duct 17 branches from the outlet duct 8 and terminates in the volute 15 of the compressor. The angle which the end portion of the feedback duct makes with the main flow direction is in this case as well such, that the exhaust gases flow into the compressor with a velocity component directed in the direction of the main flow.

The pressure of the exhaust gases drawn from the outlet duct 8 must be brought to a value which is higher than the pressure prevailing in the compressor at the point of exhaust-gas introduction so that the exhaust gases can be fed into the compressor. The compression device 21 is provided for this purpose. This device is situated after the receiver 18 and can be a centrifugal compressor or a pressure-wave machine, for example. A compression device of this kind may also be necessary with the embodiment of FIG. 1 if the pressure of the exhaust gases drawn from the inlet duct 7 is lower than the pressure in the compressor at the point of exhaust-gas introduction. As the quantity of recirculated exhaust gas is relatively small, being of the order of 5–20% of the charging air quantity, a relatively small compression device 21 is required. It can be designed with a view to ease of cleaning and its blades can be made of corrosion-resistant material.

The receiver 18 and the cooling device 20 serve the purposes already described, and can be omitted under certain circumstances. As with the embodiment shown in FIG. 1, the exhaust gases can in this case likewise be introduced into the compressor at several points if the apparatus is fitted for this purpose with branches from the feedback duct 17 or with several feedback ducts.

As mentioned above, it is convenient to provide open-loop control of the amount of exhaust gas recirculated as a function of engine output, or closed-loop control if great accuracy is aimed for, by means of a device 19. If the device is an open-loop device, it can be composed as shown in FIG. 3 and include as an essential component a function generator 22 incorporating the required quantity of recirculated exhaust gases as a function of engine output, or another value varying directly with engine output, such as rotational speed, charging pressure or exhaust-gas pressure. The feedback duct 17 contains a correcting member 23 which influences the amount of exhaust gases flowing to the compressor; this element can be a valve. The duct also contains a non-return valve 24 which prevents the air exhaust-gas mixture flowing back from the compressor to the inlet or outlet duct. The function generator 22 receives as an input signal the instantaneous engine output or a quantity varing in direct proportion to output, and supplies an output signal which is related to the required amount of exhaust gas and serves as a correcting signal for the correcting member 23. By continuously adjusting the correcting member 23, the amount of recirculated exhaust gas is made equal to the amount required for the engine output at any given time.

Instead of the open-loop control system, a closed-loop control system composed as shown in FIG. 4 can be provided. This has a function generator 22 similar to that described above, a correcting member 23 and non-return valve 24. In addition, an actual-value transmitter 25 is provided which in FIG. 4 is a flowmeter and measures the actual value of the flow or recirculated exhaust gas. The actual-value transmitter 25 can, however, also be an instrument for measuring the concentration of exhaust gas in the air/exhaust-gas mixture, in which case the function generator 22 would have to supply a desired exhaust-gas concentration as its output signal. The function generator 22, serving as desired value generator, and the actual-value transmitter 25 are connected to a differencing member 26, and this is followed by a controller 27. The differencing member 26 receives the actual value from the actual-value transmitter 25 and the desired value from the function generator 22, determines the control deviation (I-S) and passes this to the controller 27. This then generates the appropriate correcting value for adjusting the correcting member 23. In this case also, the continuous adjustment of the correcting member ensures that the exhaust gases are recirculated to the compressor 9, in the desired optimum amount for any given engine output.

I claim:

1. Apparatus for supercharging an internal combustion engine comprising:
   a turbo-charger that includes a turbine driven by the exhaust gases from the the engine coupled to an air compressor which delivers charging air to the engine, feedback means for introducing a portion of the engine exhaust gases into the flow path of the charging air, the feedback means providing a feedback path terminating at a point within said compressor where the pressure of the charging air is lower than the pressure of the exhaust gases, the point within said compressor for introducing the exhaust gases being located downstream of the rotor blading when viewed in the flow direction, and wherein said feedback path includes an open-loop control means for controlling the amount of the exhaust gases which pass therethrough.

2. Apparatus for supercharging an internal combustion engine as defined in claim 1 wherein said open-loop type control circuit includes a function generator which incorporates the amount of the exhaust gases to be passed through said feedback path either as a direct function of instantaneous engine output or as a function of a quantity which varies in direction proportion to instantaneous engine output, and said function generator receives as an input signal the said instantaneous engine output or the said quantity varying with instantaneous engine output, respectively.

3. Apparatus for supercharging an internal combustion engine as defined in claim 2 and wherein said feedback path further includes a correcting member which receives the output signal from said function generator as a correcting signal and adjusts the amount of the exhaust gas flowing through said path in relation to said signal.

4. Apparatus for supercharging an internal combustion engine as defined in claim 1 and wherein said feedback path includes a non-return valve.

5. Apparatus for supercharging an internal combustion engine comprising:

a turbo-charger that includes a turbine driven by the exhaust gases from the engine coupled to an air compressor which delivers charging air to the engine, feedback means for introducing a portion of the engine exhaust gases into the flow path of the charging air, the feedback means providing a feedback path terminating at a point within said compressor where the pressure of the charging air is lower than the pressure of the exhaust gases, the point within said compressor for introducing the exhaust gases being located downstream of the rotor blading when viewed in the flow direction, and wherein said feedback path includes a closed-loop control means for controlling the amount of the exhaust gases which pass therethrough.

6. Apparatus for supercharging an internal combustion engine as defined in claim 5 wherein said closed-loop type control circuit includes a desired value function generator which incorporates the amount of the exhaust gases to be passed through said feedback path either as a direct function of instantaneous engine output or as a function of a quantity which varies in direct proportion to instantaneous engine output, said desired value function generator receiving as an input signal the said instantaneous engine output or the said quantity varying with instantaneous engine output, respectively, a differencing member receiving as inputs thereto the outputs of said desired value function generator and an actual value transmitter which continuously measures the amount of the exhaust gas flowing in said feedback path or the exhaust gas concentration in the air/exhaust mixture and producing an output which is fed to the input of a controller, and a correcting member in said feedback path and which is adjusted by the output from said controller for adjusting the exhaust gas flow-through in said feedback path.

7. Apparatus for supercharging an internal combustion engine as defined in claim 5 and wherein said feedback path includes a non-return valve.

* * * * *